(12) United States Patent
Kumar

(10) Patent No.: US 7,698,525 B2
(45) Date of Patent: Apr. 13, 2010

(54) METHOD AND APPARATUS FOR MANAGING STORAGE USED BY A PROCESSOR WHEN PROCESSING INSTRUCTIONS

(75) Inventor: Muppirala Kishore Kumar, Karnataka (IN)

(73) Assignee: Hewlett-Packard Development Company, L.P., Houston, TX (US)

(*) Notice: Subject to any disclaimer, the term of this patent is extended or adjusted under 35 U.S.C. 154(b) by 342 days.

(21) Appl. No.: 11/219,048

(22) Filed: Sep. 1, 2005

(65) Prior Publication Data

US 2006/0047921 A1 Mar. 2, 2006

(30) Foreign Application Priority Data

Sep. 2, 2004 (GB) ................. 0419421.3

(51) Int. Cl.
*G06F 13/14* (2006.01)
(52) U.S. Cl. ............... 711/170; 711/169; 711/171; 709/223
(58) Field of Classification Search ........... 711/170, 711/169, 171; 709/223
See application file for complete search history.

(56) References Cited

U.S. PATENT DOCUMENTS

| | | | |
|---|---|---|---|
| 5,579,507 A * | 11/1996 | Hosouchi et al. ............ | 711/171 |
| 5,602,749 A | 2/1997 | Vosburgh ................ | 364/474.16 |
| 6,219,783 B1 | 4/2001 | Zahir et al. | |
| 6,360,364 B1 * | 3/2002 | Chen et al. ................... | 711/169 |
| 6,487,630 B2 | 11/2002 | Bui | |
| 7,120,775 B2 * | 10/2006 | Liu et al. ..................... | 711/170 |
| 2001/0030762 A1 | 10/2001 | Shibata et al. ............... | 358/1.9 |
| 2003/0172145 A1 * | 9/2003 | Nguyen ...................... | 709/223 |

FOREIGN PATENT DOCUMENTS

| | | |
|---|---|---|
| EP | 0 473 377 A2 | 3/1992 |
| WO | 03/009144 A1 | 1/2003 |

OTHER PUBLICATIONS

Turley, J., 64- bit CPUs: Alpha, SPARC, MIPS and Power (Feb. 21, 2002).
Weldon, R.D., et al., "Quantitative evaluation of the register stack engine and optimizations for future Itanium processors," Interactions Between Compilers and Computer Architectures, Proceedings 6th Annual Workshop, IEEE Comput. Soc. pp. 56-57 (2002).
Settle, A., et al., "Optimaization for the Intel Itanium architecture register stack," Code Generation and Optimization, pp. 115-124 (Mar. 23, 2003).

* cited by examiner

*Primary Examiner*—Tuan V Thai
*Assistant Examiner*—Yong Choe

(57) ABSTRACT

A method and apparatus is disclosed for managing storage used by a processor when processing instructions in which an estimate of register usage for program procedures or functions is generated and used to control the storage of the register bank in memory.

21 Claims, 6 Drawing Sheets

METHOD AND APPARATUS FOR MANAGING STORAGE USED BY A PROCESSOR WHEN PROCESSING INSTRUCTIONS

FIELD OF INVENTION

The present invention relates to a method for managing storage used by a processor when processing instructions. More particularly, but not exclusively, the present invention relates to managing registers used by the processor to improve the performance of the processor.

BACKGROUND OF THE INVENTION

Computer processors use a primary storage facility to store the results of processed instructions and to pass data from one instruction to another. The primary storage reduces execution time of a program by providing immediate storage for the data being processed thus avoiding any delay in transferring the data to and from memory. In the Itanium™ architecture, for example, the primary storage is referred to as a Register Stack and in the Sun SPARC™ architecture the primary storage is referred to as a Register Window.

Generally, register stacks are finite in size and as a result, as call depth increases during the execution of a set of instructions the processor needs to save the data in some of the registers in a secondary storage facility or memory. Saving register contents to memory frees up registers for the processing of subsequent sets of instructions or procedure/function calls. The SPARC™ architecture generates a trigger in the software called a trap to initiate the saving of registers to create free registers. This method works well when the call depths are shallow or when the program depth does not change significantly to cause register window overflow. Traps are however computationally expensive as outlined in 64-bit CPUs: Alpha, SPARC, MIPS and Power, by Jim Turley, Feb. 21, 2002. The Itanium™ architecture avoids the use of traps by employing a Register Save Engine (RSE) which automatically saves registers to memory. The RSE can operate in two alternative modes. In the first mode is called the lazy mode and in this mode only a new stack frame allocation triggers the RSE to save registers to memory. The second mode is called the eager and in this mode registers are saved as and when the memory bus is idle. The register saves/restores in eager mode can occur any time, not necessarily during the procedure entry and exit.

The modes of operation of the Itanium™ RSE each have drawbacks in different scenarios. Given a register stack with more free registers than are required to complete the execution of the procedure sequence, the processor would not be required to perform any register stack saves (or restores). However, if the RSE mode of operation is set to eager, the processor will aggressively pursue saving and loading back registers across the procedure call/returns, resulting unnecessary memory traffic. If the RSE operation was set to lazy mode, and program execution requires more registers then are free, the operation of the RSE may stall the execution of the program whenever a procedure's register requirement exceeds the available clean registers in the register stack.

It is an object of the present invention to provide a method and apparatus for managing storage used by a processor when processing instructions, which avoids some of the above disadvantages or at least provides a useful alternative.

SUMMARY OF THE INVENTION

According to a first aspect of the invention there is provided a method for managing storage used by a processor when processing instructions, the method comprising the steps of:
a) receiving a set of instructions for processing;
b) receiving a storage estimate indicating the required storage for processing the set of instructions;
c) comparing the required storage with free storage in a primary storage facility;
d) if the free storage is less than the storage estimate then transferring data from the primary storage to a secondary storage facility; and
e) processing the set of instructions and storing data relating to the processing in the primary storage facility.

Preferably, in step d) the transferring of data is performed whenever a communications path to the secondary storage is not in use. Preferably the method further comprises the step of:
f) if the free storage is greater than or equal to the required storage then only transferring data from the primary storage to a secondary storage facility when the primary storage facility reaches a predetermined limit. Preferably the storage used for the processing of a given set of instructions is recorded in a storage record associated with the set of instructions and the storage record is used to provide the storage estimate for a subsequent processing of the given set of instructions. Preferably the storage record is updated with the storage used for each subsequent processing of the given set of instructions. Preferably a plurality of storage estimates are provided, each the storage estimate being associated with a set of instructions.

Preferably the storage estimate is provided by one of the set of instructions. Preferably the storage estimate is generated during compilation of the set of instructions from source code. Preferably the storage estimate is generated from a call graph for the source code. Preferably the storage estimate is inserted into the set of instructions during the compilation of the source code. Preferably if during the compilation the storage requirement of one or more instructions cannot be determined then the storage estimate is determined during linking of object code for the set of instructions.

Preferably the primary storage is a register stack frame and the set of instructions are assembly code instructions representing a procedure or function call. Preferably the processor is and Itanium™ processor and the transferring of data to the secondary storage is carried out by a register stack engine. Preferably the register stack engine is switched to eager mode to carry out the transferring of data in step d).

According to a second aspect of the invention there is provided an apparatus for managing storage used by a processor when processing instructions, the apparatus comprising:
a) means for receiving a set of instructions for processing;
b) means for receiving a storage estimate indicating the required storage for processing the set of instructions;
c) means for comparing the required storage with free storage in a primary storage facility;
d) transferring means operable if the free storage is less than the storage estimate to transfer data from the primary storage to a secondary storage facility; and
e) means for storing data relating to the processing in the primary storage facility.

According to a third aspect of the invention there is provided a computer program or set of computer programs arranged to cause a computer to carry out a method for managing storage used by a processor when processing instructions, the method comprising the steps of:
a) receiving a set of instructions for processing;
b) receiving a storage estimate indicating the required storage for processing the set of instructions;
c) comparing the required storage with free storage in a primary storage facility,
d) if the free storage is less than the storage estimate then transferring data from the primary storage to a secondary storage facility, and
e) processing the set of instructions and storing data relating to the processing in the primary storage facility.

According to a fourth aspect of the invention there is provided a computer program or set of computer programs arranged to enable a computer to provide an apparatus for managing storage used by a processor when processing instructions, the apparatus comprising:
a) means for receiving a set of instructions for processing;
b) means for receiving a storage estimate indicating the required storage for processing the set of instructions;
c) means for comparing the required storage with free storage in a primary storage facility,
d) means operable if the free storage is less than the storage estimate to transfer data from the primary storage to a secondary storage facility, and
e) means for storing data relating to the processing in the primary storage facility.

According to a fifth aspect of the invention there is provided processor comprising:
a central processing unit for processing input instructions in accordance with an instruction set;
a register stack for storing data associated with the processing of instructions;
a register stack engine for managing the register stack and operable in a plurality of modes
the instruction set including an instruction operable to change the mode of the register stack engine in response to an estimate of register usage associated with a set of input instructions.

According to a sixth aspect of the invention there is provided a method of controlling the register stack engine in a processor, the method comprising the steps of:
a) receiving a required stack usage for a set of instructions to be processed;
b) comparing the required stack usage with the current stack frame;
c) if the required stack usage is greater than the free space in the current stack frame then operating the register stack engine to increase the free space by saving data from the current stack frame; and
d) processing the set of instructions.

According to a seventh aspect of the invention there is provided a method of compiling a program from source code to object code for use by a processor, the method comprising the steps of:
a) determining the memory requirement for the processing of each procedure or function;
b) inserting an instruction into the object code for each procedure call or function the instruction comprising an indication of the memory requirement of the procedure or function for use by the processor.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS OF THE INVENTION

Figure 1:
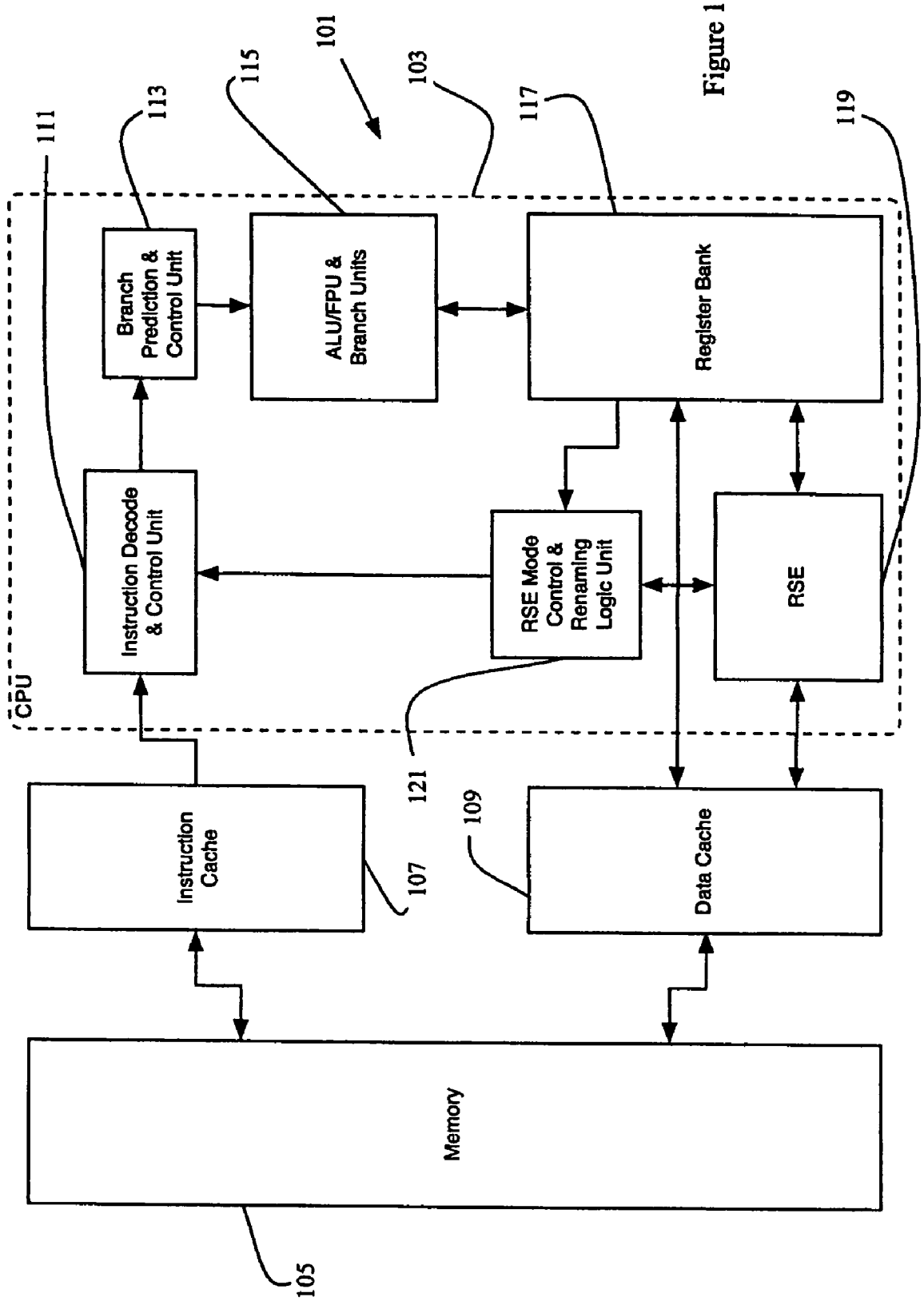
FIG. 1 is a schematic illustration of a computer processor.

FIG. 1 shows a computer processor 101 in the form of an Itanium™ processor. The processor 101 has a central processing unit (CPU) 103 indicated in FIG. 1 by a broken line. The CPU 103 is made up of a number of sub-units and is connected to a memory 105 via an instruction cache 107 and a data cache 109. The instruction cache is connected to an instruction decode and control unit (IDCU) 111 in the CPU 103 which in turn is connected to a branch prediction and control unit (BPCU) 113. The BPCU 113 is connected to an arithmetic logic unit and floating point unit (ALU/FPU) 115 which includes branch units and is, in turn, in communication with a register bank 117. The register bank 117 is in communication with a register save engine (RSE) 119 and also connected to an RSE mode control and renaming logic unit (RMC) 121. Both the RSE 119 and the register bank 117 are in communication with the data cache 109.

The memory 105 is addressable and accessible by the CPU 103. All memory accesses by the CPU 103 are routed through the instruction cache 109 or the data cache 109 to improve program execution time. The IDCU 111 fetches instructions for the processor that are stored in the memory 105 via the instruction cache 107 and then decodes the instruction and passes information/actions as appropriate to the other sub-units of the CPU 103. The BPCU 113 analyses instructions destined for the ALU 103 to predict the likelihood of a branch instruction being taken by the instruction stream and provides this data to the branch units in the ALU/FPU 115. The ALU/FPU 115 processes received instructions and in doing so access the registers in the register bank 117 to store and retrieve data. The register bank 117 is the complete physical register bank for the CPU 103.

The RMC 121 manages the use of the register bank 117 by the ALU 115 and in doing so controls which registers are architecturally visible to a current instruction stream. The RMC allocates and de-allocates groups of registers which are associated with a set of instructions being processed. Such groups of registers are referred to as stack frames. The RMC 121 also controls the mode of operation of the RSE 119 which stores and loads the contents of the registers to and from the memory 105 as a background operation.

The RSE 119 operates in one of two modes referred to as a lazy mode and an eager mode. In the lazy mode the RSE waits for new stack frame to be allocated by the RMC 121 before it stores the contents of registers to the memory 105. Similarly, when a stack frame is de-allocated, registers are renamed and the RSE 119 restores or loads the contents of the registers that belong to the previous stack frame from memory if required. In eager mode the RSE 119 will attempt to perform loads and stores between the memory 105 and the register bank 117 whenever the communications link between them, that is the memory bus, is idle.

Figure 2:
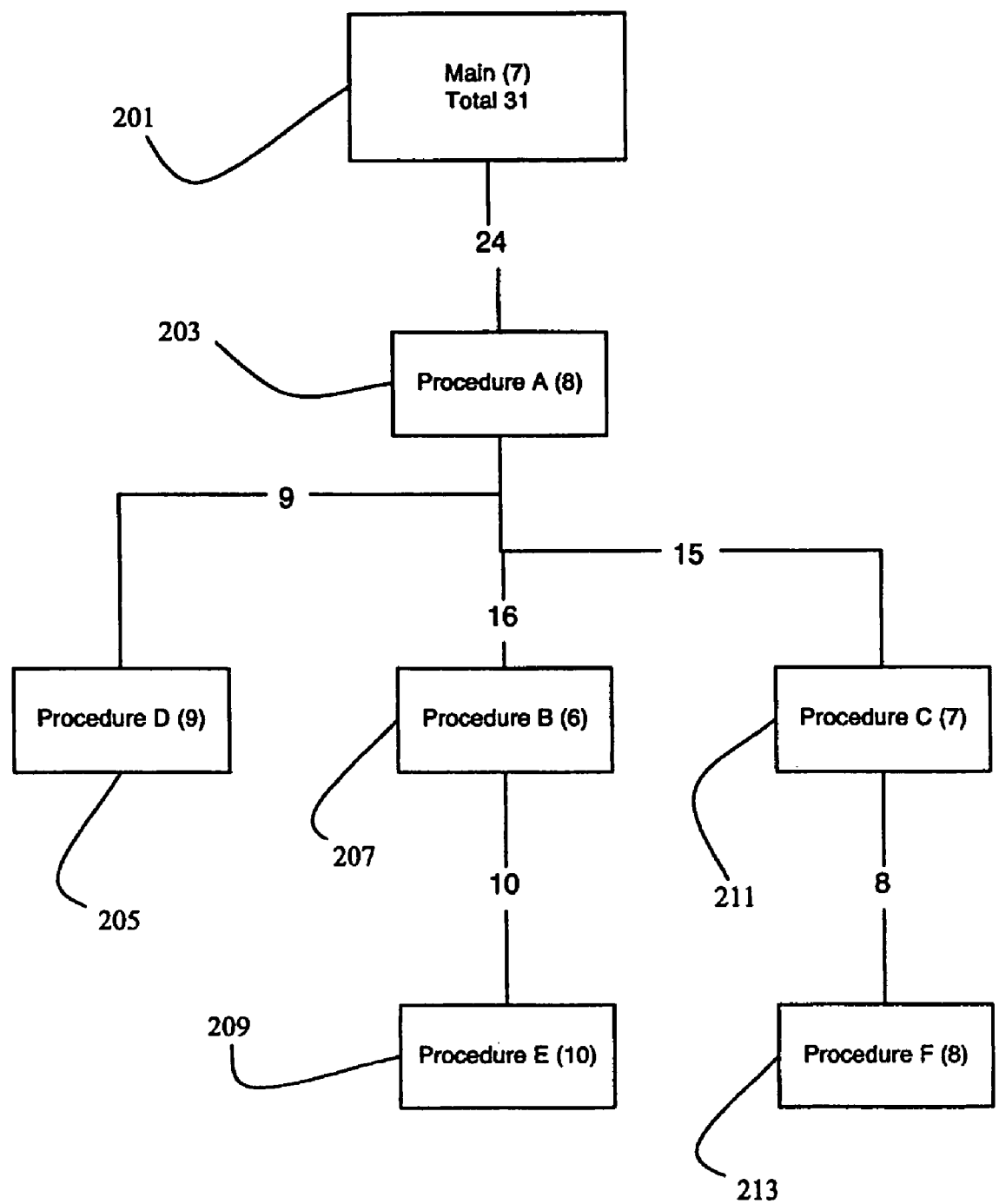
FIG. 2 is a schematic representation of a program for use with the processor of FIG. 1.

FIG. 2 is a call graph for a segment of a program (not shown) which maps procedures or function calls within the program segment. The call graph shows that a main program segment 201 calls a procedure A 203 which in turn may invoke a procedure D 205, a procedure B 207 or a procedure C 211. The procedure B 207 may in turn invoke a procedure E and the procedure C 211 may in turn invoke a procedure F 213. The numbers in brackets in each procedure shown in FIG. 2 indicate the registers used by each procedure. The numbers along the arcs indicate the maximum number of registers used by the procedures represented by the nodes below the arc. The maximum number of registers used by a given procedure is:

Maximum Usage (*P*)=Own Usage (*P*)+Maximum Usage (descendants of *P*)

The minimum number of registers likely to be used by procedure P is:

Minimum Usage (*P*)=Own Usage (*P*)+Minimum Usage (descendants of *P*)

The registers used by procedure P and its descendants when the program is actually executing will vary between Minimum Usage (P) and Maximum Usage (P). In the program segment shown in FIG. 2, the theoretical maximum number of registers required by the overall program is 31. However, during the actual execution, the code path taken by the program may not actually invoke all of the procedures and therefore would use fewer registers.

The RMC 121 monitors the usage of the register bank during the processing of instructions by the CPU 103. The RMC maintains the following ordered lists:

a) Current Call Depth (CCD)—a cumulative list of the actual register allocation for each procedure or function call and that of its callees at any given time;

b) Dynamic Maximum Register Usage (DMRU)—a cumulative list of maximum register usage of each procedure or function during its processing; and c) Required Register Estimate (RRE)—a list of procedure or function names, each associated with an estimate of the number of registers that the procedure or function will use the next time it is called.

When a program is compiled for use with an Itanium™ processor, the compiler determines the number of registers required for a given procedure or function call. The compiler enters an instruction called an alloc instruction at the start of the object code for each procedure or function call which defines the register requirements for that procedure or function. When the object code is processed then on entry into a procedure/function the alloc instruction is executed and the appropriate stack frame size allocated to that procedure. The RMC 121 updates the Dynamic Maximum Register Usage list with the stack frame size resulting from the alloc instruction. On exit from the procedure, the Required Register Estimate is updated with the value for that procedure from the Dynamic Maximum Register Usage list.

The processing of the contents of the three lists noted above will now be described with reference to the processing of a program segment set out below in pseudo code in which the program Main calls procedure A which in turn calls procedure B. Procedure B then returns and procedure D is called and returns followed by the return of procedure A.

```
Main (a, b, c);
    Procedure A (a, b, c);
        Procedure B (a, b, c);
        Procedure D (a, b, c);
End.
```

On entering the program Main, seven registers are allocated to the procedure Main in response to the processing of the alloc instruction and the fist element of the Current Call Depth (CCD) list is updated with that value. The first element of the Dynamic Maximum Register Usage (DMRU) list is also updated with the same value along with a label for the procedure. The contents of the lists are then as follows:

Current Call Depth

| 7 | | | | |
|---|---|---|---|---|

Dynamic Maximum Register Usage

| 7 | | | | |
|---|---|---|---|---|
| Main | | | | |

Required Register Estimate

| | | | | |
|---|---|---|---|---|

On entering procedure A, a further alloc instruction is processed which allocates eight registers to the procedure. Accordingly, the next element of the CCD list is updated with that value and the next element of the DMRU list is updated with the value and the procedure name. Also, the value is added to the value stored in both lists for the predecessors of procedure A as shown below:

Current Call Depth

| 15 | 8 | | | |
|---|---|---|---|---|

Dynamic Maximum Register Usage

| 15 | 8 | | | |
|---|---|---|---|---|
| Main | Proc A | | | |

Required Register Estimate

| | | | | |
|---|---|---|---|---|

On entering procedure B, six registers are allocated, the value added to the CCD list and added to each of the predecessors in the list. The value is placed in the first free element in the DMRU list along with the procedure name. The predecessors in the DMRU list are also updated with the new maximums from the CCD list as shown below:

Current Call Depth

| 21 | 14 | 6 | | |
|----|----|---|---|---|

Dynamic Maximum Register Usage

| 21   | 14     | 6      | | |
|------|--------|--------|---|---|
| Main | Proc A | Proc B | | |

Required Register Estimate

| | | | | |
|---|---|---|---|---|

On returning from procedure B, the value form the CCD list for the procedure is removed from the list and its predecessors' values decremented by the same amount. The entry for the procedure from the DMRU list is transferred to the Required Register Estimate (RRE) list. The remaining values in the DMRU list remain unchanged as shown below:

Current Call Depth

| 15 | 8 | | | |
|----|---|---|---|---|

Dynamic Maximum Register Usage

| 21   | 14     | | | |
|------|--------|---|---|---|
| Main | Proc A | | | |

Required Register Estimate

| Proc B | | | | |
|--------|---|---|---|---|
| 6      | | | | |

On entering procedure D, nine registers are allocated to the procedure. The value is added to the first free element in the CCD list and to each predecessor. Similarly, the value and procedure name are added to the first free element of the DMRU list and each predecessor is updated with the new maximum register usage from the CCD list as shown below:

Current Call Depth

| 24 | 17 | 9 | | |
|----|----|---|---|---|

Dynamic Maximum Register Usage

| 24   | 17     | 9      | | |
|------|--------|--------|---|---|
| Main | Proc A | Proc D | | |

Required Register Estimate

| Proc B | | | | |
|--------|---|---|---|---|
| 6      | | | | |

On returning from Procedure D, the value from the CCD list for the procedure is removed from the list and its predecessors' values decremented by the same amount. The entry for the procedure from the DMRU list is transferred to the RRE list. The remaining values in the DMRU remain unchanged as shown below:

Current Call Depth

| 15 | 8 | | | |
|----|---|---|---|---|

Dynamic Maximum Register Usage

| 24   | 17     | | | |
|------|--------|---|---|---|
| Main | Proc A | | | |

Required Register Estimate

| Proc B | Proc D | | | |
|--------|--------|---|---|---|
| 6      | 9      | | | |

On retuning from Procedure A, the value form the CCD list for the procedure is removed from the list and its predecessors' values decremented by the same amount. The entry for the procedure from the DMRU list is transferred to the Required Register Estimate (RRE) list. The remaining values in the DMRU remain unchanged as shown below:

Current Call Depth

| 7 | | | | |
|---|---|---|---|---|

Dynamic Maximum Register Usage

| 24   | | | | |
|------|---|---|---|---|
| Main | | | | |

Required Register Estimate

| Proc B | Proc D | Proc A | | |
|--------|--------|--------|---|---|
| 6      | 9      | 17     | | |

In the present embodiment each of the three lists described above has forty entries. In other words, data can be held for forty procedures or functions. If more than forty procedures are encountered in the processing of a program the RMC 121 is arranged to replace the oldest entry in each of the lists with entries for each new procedure as and when the new procedures are encountered.

Each time a procedure is entered, the RMC 121 carries out two tasks effectively in parallel. Firstly, the RMC begins the maintenance of the three lists noted above to create the entries in the RRE list as noted above. Secondly, the RMC inspects the RRE list for an existing entry for the procedure being entered.

If an entry for a given procedure is present then the RMC 121 retrieves the associated value and uses it to control the operation of the RSE 119. The RMC uses the value from the RRE as an estimate of the register usage for the procedure and compares this to the number of free registers in the register bank. If, according to the estimate, there are fewer free registers than are needed for the current procedure and its callees, the RMC instructs the RSE to continue in its default eager mode. If there are more free registers than are needed for the current procedure and its callees according to the estimate then the RMC instructs the RSE to switch modes to the lazy mode. In this way, the RMC controls the mode of the RSE so that it operates in its lazy mode whenever appropriate.

Figure 3:
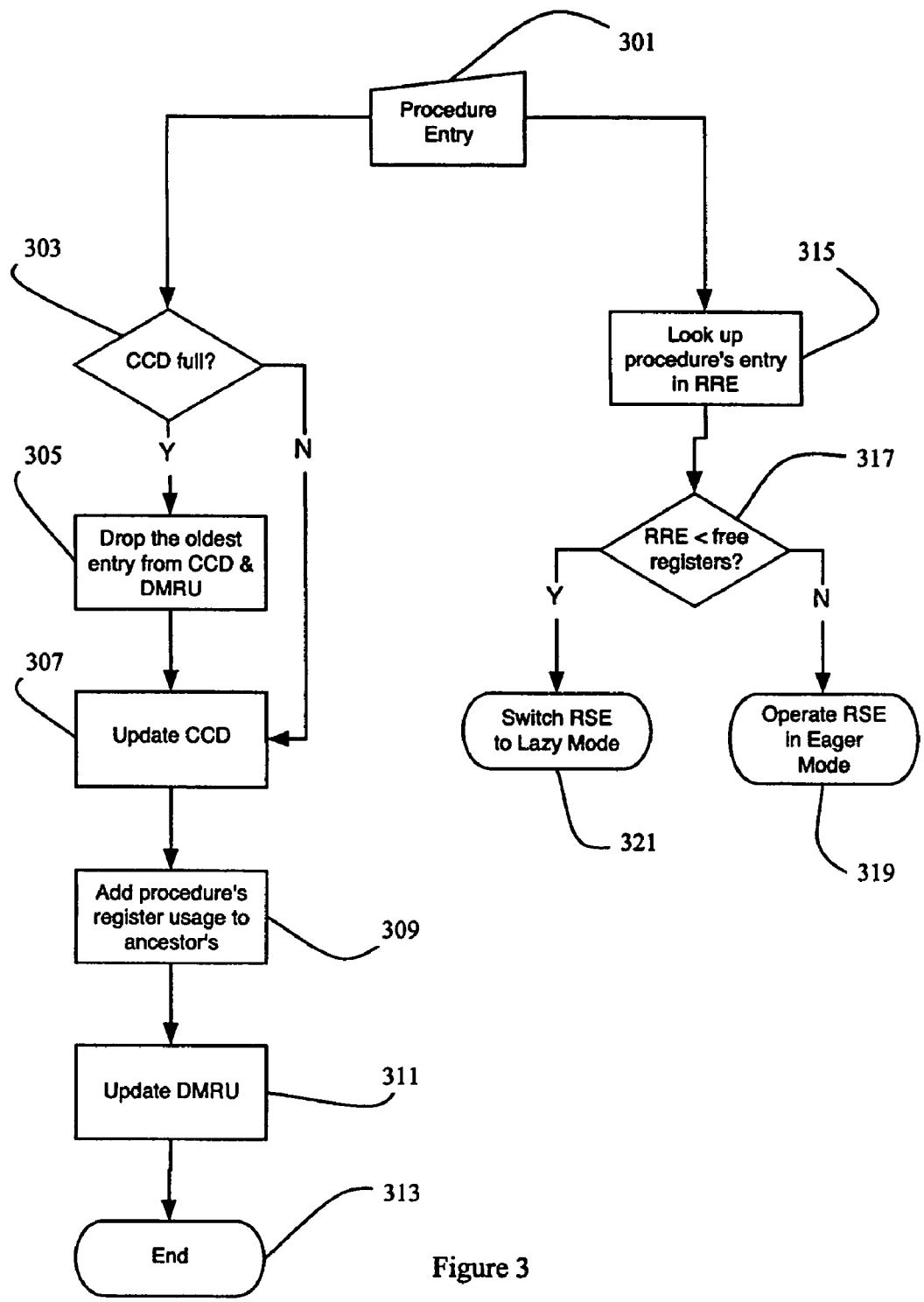
FIG. 3 is a flow chart illustrating the operation of the processor of FIG. 1 in accordance with first embodiment of the invention.

The performance of the RMC 121 when a program being processed enters a procedure is set out in the flow chart of FIG. 3. At step 301 the procedure entry is detected by the RMC and two parallel streams of processing are initiated. The first process moves to step 303 where a check is carried out to establish is the CCD list is full, in other words has more than forty entries. If the CCD is not full then processing moves to step 307. If the CCD list is full then processing moves to step 305 where the oldest entry from both the CCD and DMRU lists are removed and processing moves to step 307.

At step 307, the CCD list is updated with an entry holding the number of registers allocated to the procedure being processed and at step 309 the entries for each ancestor of the new entry have the new value added to their entries. Processing then moves to step 311 where the DMRU list has an entry added which includes the name of the procedure and the register allocation for the new procedure. Also, each ancestors entry is updated with the maximum register value in the DMRU list and the corresponding entry in the CCD. In other words, if the value for a given procedure in the CCD list is higher than the corresponding value in the DMRU list then the DMRU list entry is update with the value from the CCD list entry. In this manner, the maximum register usage for any given procedure being processed in recorded in the DMRU list. Processing then ends at step 313.

The second stream of processing on procedure entry takes processing to step 315 at which the RMC 121 looks up the procedure's name in the RRE list and if present retrieves the register usage estimate. Processing then moves to step 317 at which the register usage estimate is compared to the current number of free registers in the register bank 117. If the number of free registers is greater than the register usage estimate then processing moves to step 319 where the mode of the RSE 119 is maintained in the default, eager mode. If however the number of free registers is more than the required register estimate then processing moves to step 321 where the mode of the RSE 119 is switched from the default mode to lazy mode.

Figure 4:
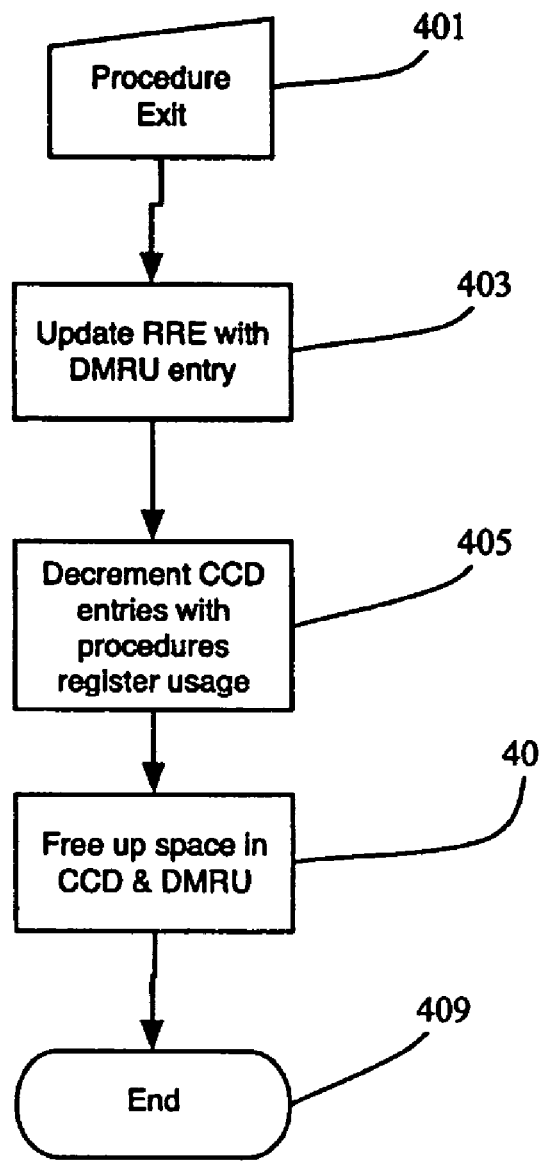
FIG. 4 is a flow chart illustrating further operation of the processor.

The performance of the RMC 121 when a program being processed exits a procedure is set out in the flow chart of FIG. 4. At step 401, the procedure exit is detected by the RMC and processing moves to step 403 where the DMRU list entry for the procedure is placed in the RRE list either as a new entry if this is the first processing of the procedure or as an update to an existing entry for the procedure. Processing then moves to step 405 at which each entry in the CCD list is decremented by the value in that list for the current procedure and processing moves to step 407. At step 407, the entries in the DMRU and CCD lists for the exiting procedure are removed and at step 409 the process ends.

In summary, the system described above provides an estimate of the number of register stack registers required by each routine. The run time computed register usage values are stored and can be looked-up or updated for a given routine. On entry into a procedure, the RMC looks-up the entry for the procedure. If an entry is found, the value of depth stored is compared with the number of free registers available. If sufficient registers are free, the back-in-store operation of the RSE engine will be switched to lazy mode. If no entry is found for the given procedure, the RSE will continue to operate in its default eager mode. Given that most programs spent 80% of their execution time in 20% of their code a small RRE list is usually sufficient to store the most recent procedures or functions executed by a program and aid in switching the operation mode of the RSE. The size of the RRE list may be varied and can be determined from empirical analysis or simulations.

In a second embodiment of the invention, instead of an estimate of the register usage for each procedure or function being created dynamically by the hardware, the estimate is created statically during the compilation, loading and linking process of the source code into object code. The compiler, linker and loader programs operate to estimate register usage for each procedure or function in the program and to insert special instructions called RSE hint instructions into the object code. The RSE hint instructions are processed at run time and used by the RMC to control the mode of the RSE appropriately.

Figure 5:
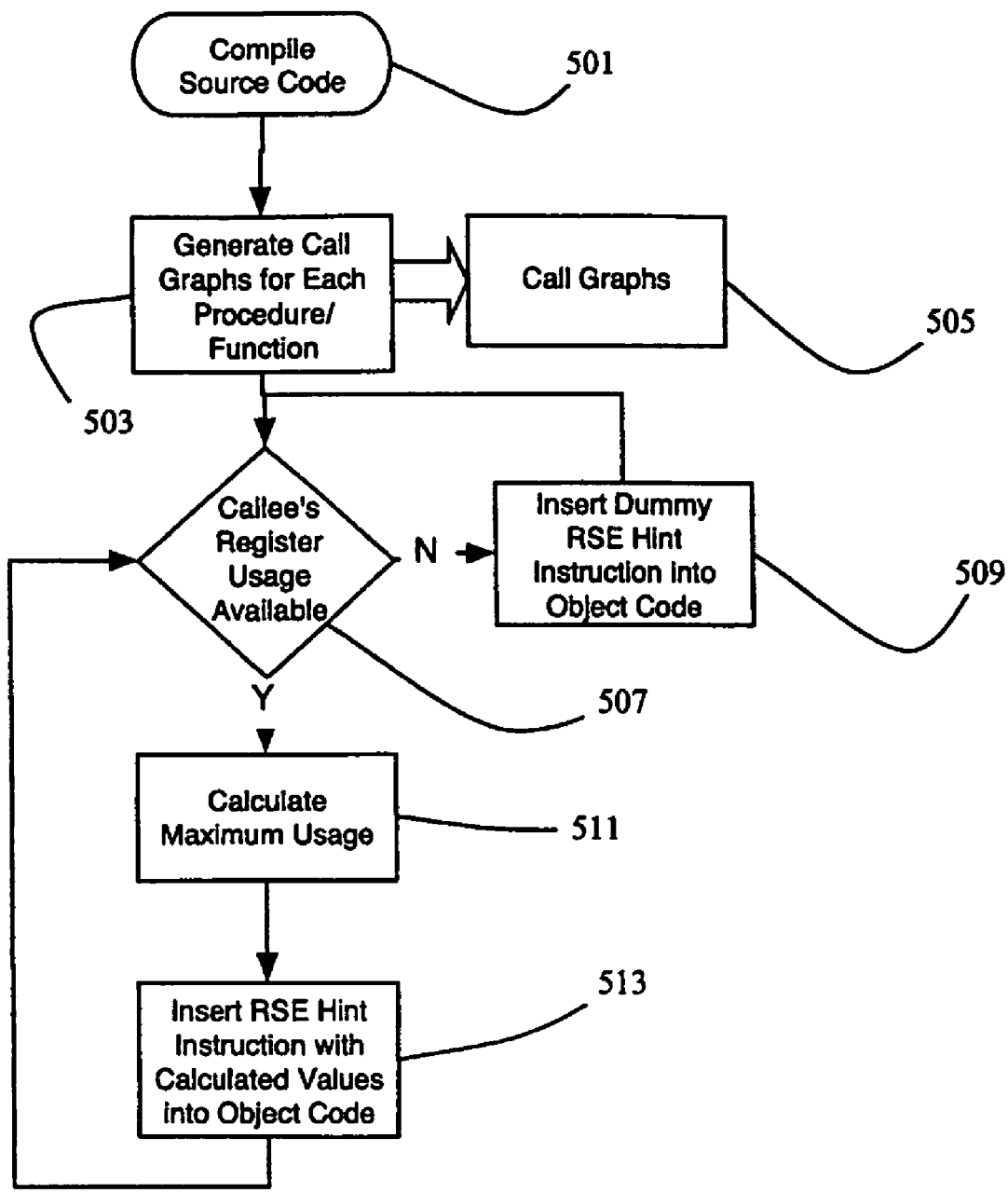
FIG. 5 is a flow chart illustrating the operation of a compiler program for the program of FIG. 2 in accordance with a second embodiment of the invention.

The steps carried out by the compiler are illustrated in the flowchart of FIG. 5. At step 501, the compilation process is initiated and processing moves to step 503 where the compiler creates a call graph 505 covering each procedure or function in the source code. The call graph may be represented in the form of a directed acyclic graph. FIG. 2 shows a call graph for a program in which the main program segment 201 calls procedure A 203 which in turn may invoke procedure D 205, procedure B 207 or procedure C 211. Procedure B 207 may in turn invoke procedure E and procedure C 211 may in turn invoke procedure F 213.

Once the call graph 505 has been created, processing moves to step 507 where a check is carried out to establish whether or not register usage is available for each procedure in turn. If a procedure/function that make calls to procedures/ functions whose register usage details are not available at the program compile time, processing moves to step 509 where the compiler generates a dummy RSE hint instruction into the object code being generated. The register usage details may not be present, for example, where a call is made to a library procedure which may be statically or dynamically linked. The dummy RSE hint instruction is used by the linker and loader programs that later process the object code to insert real RSE hint instructions when the register usage details for the relevant procedure or function become available. Once a dummy RSE hint instruction has been inserted processing returns to step 507 to process the next procedure or function.

If at step 507 all callee's register usage data is available then processing then moves to step 511 where, for each procedure P in the call graph the maximum register usage is calculated. The calculation is the sum of the register usage applied to the given procedure P and the maximum usage of each procedure or function that is called from within the procedure P, that is, the maximum usage of the callees of procedure P. The formula can be summarised as:

$$\text{Maximum Usage } P = \text{Usage of } P + \text{Maximum Usage of Callees of } P$$

In FIG. 2, the numbers in brackets in each procedure indicate the registers used by each procedure as calculated by the compiler. The numbers along the arcs indicate the maximum number of registers used by the procedures represented by the nodes below the arc as calculated using the formula above.

Processing in the flow chart of FIG. 5 then moves to step 513 where the RSE hint instruction including the register usage estimate is inserted into the object code for the procedure or function being processed. Processing then returns to step 507 where the next procedure or function is processed as described above. Processing continues until all procedures and function in the object code have been processed and either dummy or real RSE hint instructions inserted into their corresponding object code.

Where the compiler has inserted dummy RSE hint instructions, the linker/loader program can patch the compiler generated dummy RSE hint instructions when the correct register usage data is available before the program begins to execute.

The linker/loader will only patch the RSE hint instructions that the compiler has explicitly left to be patched. If the compiler and the linker/loader are unable to determine the register usage for a procedure then the dummy RSE hint instruction is left in the code. Essentially the dummy RSE instruction carries a register usage value of minus one. An example of when register usage may not be determinable prior to execution is when a procedure or function is recursive. Such recursion can be identified by cycles in the call graph. The same technique is applied when dynamic (pointer based) calls are encountered by the compiler or linker/loader programs.

As noted above, the RSE hint instruction is inserted into the object code. The CPU 103 is arranged in the present embodiment to include RSE hint instructions in its instruction set. In response to such instructions, the RMC 121 controls the mode of operation of the RSE 119.

Figure 6:
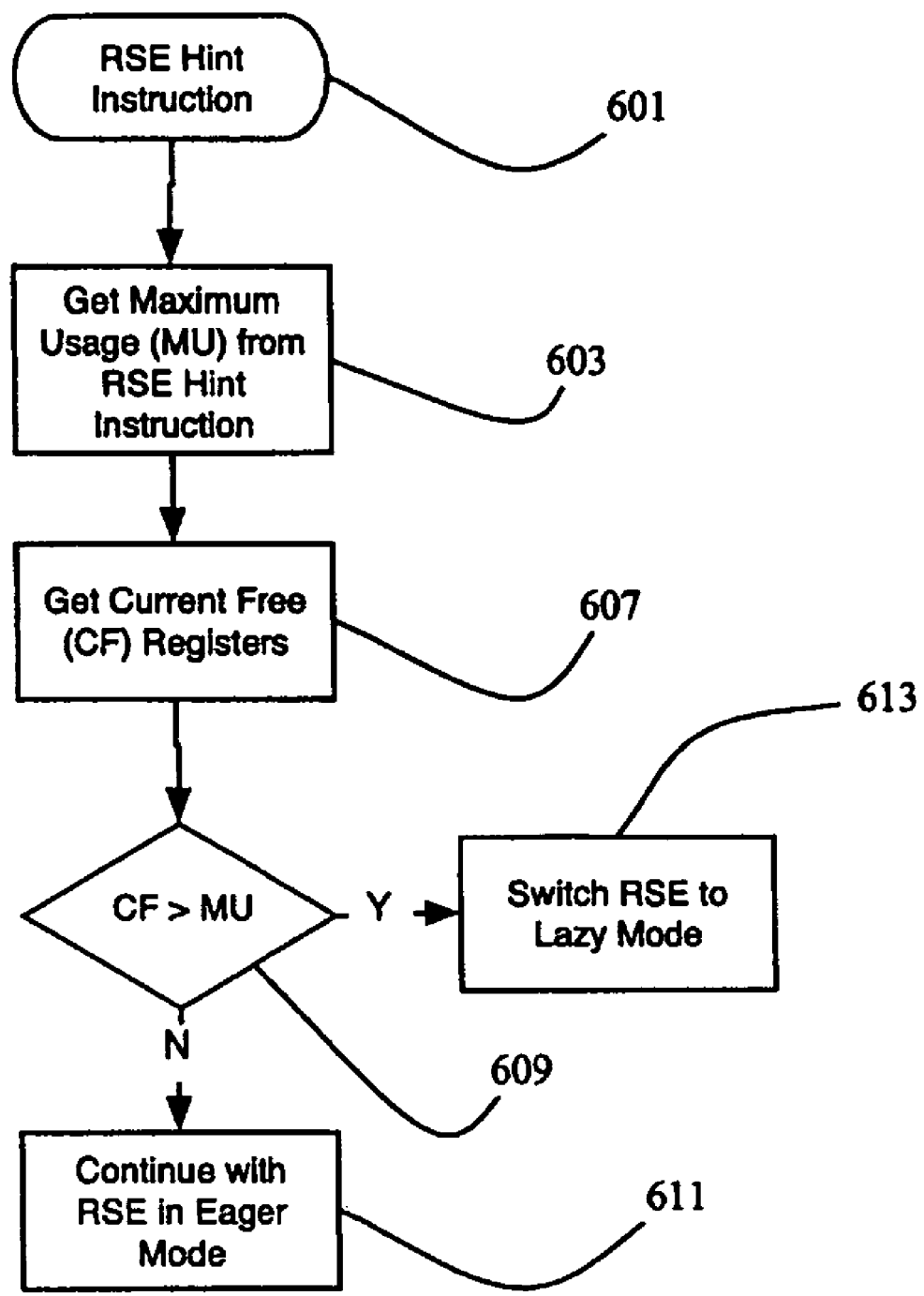
FIG. 6 is a flow chart illustrating the operation of the processor of FIG. 1 in accordance with the second embodiment.

The processing of the RSE hint instruction is illustrated in the flow chart of FIG. 6 in which at step 602 the RSE hint instruction is identified and processing moves to step 603. At step 603 the maximum register usage is extracted from the instruction and processing moves to step 607 where the number of free registers in the register bank 117 is retrieved. Processing then moves to step 609 where the number of currently free registers is compared to the maximum register usage. If the number of free registers is less than the maximum register usage then processing moves to step 611 where the RSE is left to continue in its default, eager mode of operation. If at step 609 the number of current free registers is more than the maximum register usage then processing moves to step 613 where the RSE is switched to its lazy mode of operation. When the procedure or function exits or returns, the RMC 121 switches the RSE back to its eager mode as the default. When the RMC encounters a value of minus one in an RSE hint instruction the mode of the RSE engine remains unchanged.

In the embodiment described above with reference to FIG. 5, the compiler, in step 511 calculates the maximum register usage of each procedure or function in the program being compiled. In an alternative embodiment, the compiler performs in the same manner as described above with reference to FIG. 5 except that instead it calculates the minimum register usage for each procedure or function and inserts this value into the RSE hint instruction in the object code. The calculation is the sum of the register usage applied to the given procedure P and the minimum usage of each procedure or function that is called from within the procedure P, that is, the minimum usage of the callees of procedure P. The formula can be summarised as:

Minimum Usage $P$=Usage of $P$+Minimum Usage of Callees of $P$

Similarly, the RMC in this alternative embodiment is arranged to operate in the same manner as described above with reference to FIG. 6 except that in steps 603 and 609 the minimum register usage is used instead of the maximum register usage.

In a further alternative embodiment, both the maximum and minimum register usage are calculated by the compiler and inserted into the RSE hint instruction in the object code.

In the embodiments described above the invention is performed in the context of the Itanium™ architecture which implements a register save engine to manage the register bank. In other embodiments the CPU may use other mechanisms to manage the storage that is used in the processing of instructions. Also, any storage used by the CPU need not be on-chip registers as is the case with Itanium™ but may be any other suitable storage facility or combination thereof. Primary storage refers to the storage facility which provides the immediate storage for the CPU during its processing of instructions. The term secondary storage refers to the storage used to provide space for saving the contents of primary storage and is addressable by the address space of the CPU. The physical location of the primary and secondary storage is dependent on a particular implementation. Either storage facility may be provided by registers or by memory, either locally to the CPU or remote from it.

It will be understood by those skilled in the art that the apparatus that embodies a part or all of the present invention may be a general purpose device having software arranged to provide a part or all of an embodiment of the invention. The device could be single device or a group of devices and the software could be a single program or a set of programs. Furthermore, any or all of the software used to implement the invention can be communicated via various transmission or storage means such as computer network, floppy disc, CD-ROM or magnetic tape so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. A method for managing storage used by a processor when processing instructions, the method comprising the steps of:

receiving a set of instructions for processing, wherein said set of instructions are assembly code instructions representing a procedure or function call;

receiving a storage estimate indicating required storage for processing said set of instructions, wherein said storage estimate is provided by one of said set of instructions, and wherein said storage estimate is generated during compilation of said set of instructions from source code and said storage estimate is generated from a call graph for said source code, and wherein said storage estimate is a number of registers required for processing said set of instructions;

comparing said storage estimate with free storage in a primary storage facility, wherein said primary storage facility is a register stack frame;

if said free storage is less than said storage estimate then transferring data from said primary storage to a secondary storage facility;

if said free storage is greater than or equal to said storage estimate then only transferring data from said primary storage facility to said secondary storage facility when said primary storage facility reaches a predetermined limit; and processing said set of instructions and storing data relating to said processing in said primary storage facility.

2. A method according to claim 1, wherein said transferring of data is performed whenever a communications path to said secondary storage is not in use.

3. A method according to claim 1 in which the storage used for the processing of a given set of instructions is recorded in a storage record associated with said set of instructions, and said storage record is used to provide said storage estimate for a subsequent processing of said given set of instructions.

4. A method according to claim 3 in which the storage record is updated with the storage used for each subsequent processing of said given set of instructions.

5. A method according to claim 1 in which a plurality of storage estimates are provided, each said storage estimate being associated with a set of instructions.

6. A method according to claim 1 in which the storage estimate is inserted into said set of instructions during said compilation of said source code.

7. A method according to claim 1 in which if during said compilation the storage requirement of one or more instructions cannot be determined then said storage estimate is determined during linking of object code for said set of instructions.

8. A method according to claim 1 in which the processor is a 64 bit processor, and said transferring of data to said secondary storage is carried out by a register stack engine.

9. A method according to claim 8 in which the register stack engine is switched to eager mode to carry out said transferring of data.

10. An apparatus for managing storage used by a processor when processing instructions, the apparatus comprising:
means for receiving a set of instructions for processing, wherein said set of instructions are assembly code instructions representing a procedure or function call;
means for receiving a storage estimate indicating the required storage for processing said set of instructions, wherein said storage estimate is provided by one of said set of instructions, and wherein said storage estimate is generated during compilation of said set of instructions from source code and said storage estimate is generated from a call graph for said source code, and wherein said storage estimate is number of registers required for processing said set of instructions;
means for comparing said required storage with free storage in a primary storage facility, wherein said primary storage is a register stack frame;
transferring means operable, if said free storage is less than said storage estimate, to transfer data from said primary storage to a secondary storage facility;
if said free storage is greater than or equal to said required storage, said transferring means is further operable to transfer data from the primary storage to a secondary storage facility when said primary storage facility reaches a predetermined limit; and
means for storing data relating to said processing in said primary storage facility.

11. The apparatus according to claim 10 in which said transferring means is operable to transfer data whenever a communications path to said secondary storage is not in use.

12. The apparatus according to claim 10 in which the storage used for the processing of a given set of instructions is recorded in a storage record associated with said set of instructions, and said storage record is used to provide said storage estimate for a subsequent processing of said given set of instructions.

13. The apparatus according to claim 12 in which the storage record is updated with the storage used for each subsequent processing of said given set of instructions.

14. The apparatus according to claim 10 in which a plurality of storage estimates are provided, each said storage estimate being associated with a set of instructions.

15. The apparatus according to claim 10 in which the storage estimate is inserted into said set of instructions during said compilation of said source code.

16. The apparatus according to claim 10 in which if during said compilation the storage requirement of one or more instructions cannot be determined, then said storage estimate is determined during linking of object code for said set of instructions.

17. The apparatus according to claim 10 in which the processor is a 64 bit processor, and said transferring of data to said secondary storage is carried out by a register stack engine.

18. The apparatus according to claim 17 in which the register stack engine is switched to eager mode to carry out said transferring of data.

19. A non-transitory computer-readable storage medium for managing storage used by a processor having instructions that, when executed by the computing device, cause the computing device to perform a method comprising:
receiving a set of instructions for processing, wherein said set of instructions are assembly code instructions representing a procedure or function call;
receiving a storage estimate indicating the required storage for processing said set of instructions, wherein said storage estimate is provided by one of said set of instructions, and wherein said storage estimate is generated during compilation of said set of instructions from source code and said storage estimate is generated from a call graph for said source code, and wherein said storage estimate is a number of registers required for processing said set of instructions;
comparing said required storage estimate with free storage in a primary storage facility, wherein said primary storage facility is a register stack frame;
if said free storage is less than said storage estimate then transferring data from said primary storage to a secondary storage facility; and
if said free storage is greater than or equal to said storage estimate then only transferring data from said primary storage facility to said secondary storage facility when said primary storage facility reaches a predetermined limit; and
processing said set of instructions and storing data relating to said processing in said primary storage facility.

20. A non-transitory computer-readable storage medium for managing storage used by a processor having instructions that, when executed by the computing device, cause the computing device to provide an apparatus, comprising:
means for receiving a set of instructions for processing, wherein said set of instructions are assembly code instructions representing a procedure or function call;
means for receiving a storage estimate indicating the required storage for processing said set of instructions, wherein said storage estimate is provided by one of said set of instructions, and wherein said storage estimate is generated during compilation of said set of instructions from source code and said storage estimate is generated from a call graph for said source code, and wherein said storage estimate is number of registers required for processing said set of instructions;
means for comparing said required storage with free storage in a primary storage facility, wherein said primary storage is a register stack frame;
transferring means operable, if said free storage is less than said storage estimate, to transfer data from said primary storage to a secondary storage facility; and if said free storage is greater than or equal to said required storage, said transferring means is further operable to transfer data from the primary storage to a secondary storage facility when said primary storage facility reaches a predetermined limit; and means for storing data relating to said processing in said primary storage facility.

21. A processor comprising:

a central processing unit for processing input instructions in accordance with an instruction set;

a register stack for storing data associated with the processing of said input instructions;

a register stack engine for managing the register stack and operable in a plurality of modes, wherein said instruction set includes an instruction operable to change the mode of the register stack engine in response to an estimate of register usage associated with said instruction set, wherein said instruction set comprises assembly code instructions representing a procedure or function call, and wherein said estimate of register usage is generated during compilation of said instruction set from source code and said estimate of register usage is generated from a call graph for said source code, and wherein said estimate of register usage is number of registers required for processing said instruction set, and wherein the register stack compares said estimate of register usage with free storage in a primary storage facility, and wherein said primary storage facility is a register stack frame, and wherein the register stack transfers data from said primary storage facility to a secondary storage facility if said free storage is less than said estimate of register usage, and wherein the register stack transfers data from the primary storage facility to said secondary storage facility when said primary storage facility reaches a predetermined limit if said free storage is greater than or equal to said estimate of register usage, and wherein said register stack stores data relating to said processing in said primary storage facility.

* * * * *